United States Patent
Suzuki et al.

(10) Patent No.: US 7,887,770 B2
(45) Date of Patent: Feb. 15, 2011

(54) AMORPHOUS ALUMINUM SILICATE AND ADSORBENT EACH HAVING EXCELLENT MOISTURE ADSORPTION/DESORPTION CHARACTERISTICS IN MEDIUM-HUMIDITY RANGE

(75) Inventors: Masaya Suzuki, Ibaraki (JP); Chieko Ikeda, Ibaraki (JP); Keiichi Inukai, Aichi (JP); Masaki Maeda, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 12/521,140

(22) PCT Filed: Feb. 27, 2007

(86) PCT No.: PCT/JP2007/053596
§ 371 (c)(1),
(2), (4) Date: Jun. 25, 2009

(87) PCT Pub. No.: WO2008/081605
PCT Pub. Date: Jul. 10, 2008

(65) Prior Publication Data
US 2010/0028237 A1 Feb. 4, 2010

(30) Foreign Application Priority Data
Dec. 27, 2006 (JP) .............................. 2006-351792

(51) Int. Cl.
*C01B 33/26* (2006.01)
(52) U.S. Cl. .................................................. 423/328.1
(58) Field of Classification Search ........................ None
See application file for complete search history.

(56) References Cited

U.S. PATENT DOCUMENTS

| | | | |
|---|---|---|---|
| 6,254,845 B1 * | 7/2001 | Ohashi et al. | 423/328.1 |
| 2010/0113265 A1 | 5/2010 | Suzuki et al. | |

FOREIGN PATENT DOCUMENTS

| | | |
|---|---|---|
| JP | 2000-128520 A | 5/2000 |
| JP | 2001-064010 A | 3/2001 |
| JP | 2001-220129 A | 8/2001 |

(Continued)

OTHER PUBLICATIONS

Koenderink et al, On the synthesis on colloidal imogolite fibers, 1999, Journal of colloid and interface science, 216, pp. 429-431.*

(Continued)

*Primary Examiner*—Melvin C Mayes
*Assistant Examiner*—Stefanie Cohen
(74) *Attorney, Agent, or Firm*—Howson & Howson LLP

(57) ABSTRACT

Provided is an adsorbent having excellent adsorption performance in a medium-humidity range by employing an amorphous aluminum silicate formed from protoimogolite. The amorphous aluminum silicate formed from protoimogolite is synthesized by setting the Si/Al ratio in solution mixing to be of a condition that is higher than synthesizing imogolite or amorphous imogolite, and performing desalting treatment and heating thereto. The obtained amorphous aluminum silicate formed from protoimogolite yields a superior water vapor adsorption performance of 30 wt % or higher at a relative humidity of 60%, and can be used as an adsorbent for desiccant air conditioning.

8 Claims, 2 Drawing Sheets

FOREIGN PATENT DOCUMENTS

| | | | | |
|---|---|---|---|---|
| JP | 2002059926 | A | * | 2/2002 |
| JP | 2004-059330 | A | | 2/2004 |
| JP | 2004059330 | A | * | 2/2004 |

OTHER PUBLICATIONS

M.A. Wilson et al., "Thermal Transformation of Synthetic Allophane and Imogolite as Revealed by Nuclear Magnetic Resonance", The Mineralogical Society, Clay Minerals, vol. 23, pp. 175-190, Jan. 1988.

F. Ohashi et al., "Synthesis of Spherical Hollow Amorphous Aluminosilicate Using Rapid Mixing Method", Reports of the National Industrial Research Institute of Nagoya, vol. XLM, No. 8, FIG. 6, Aug. 1997.

* cited by examiner

[Figure 1]
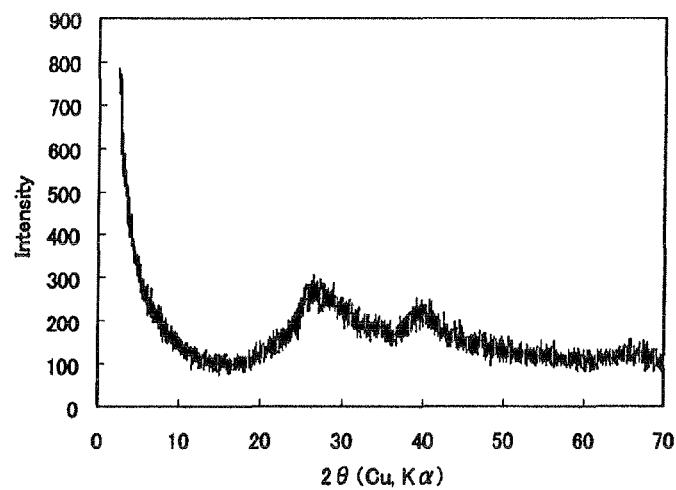
[Figure 2]
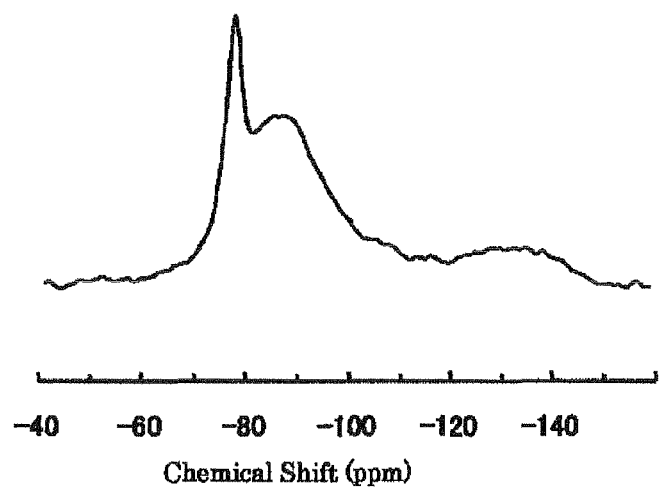
[Figure 3]
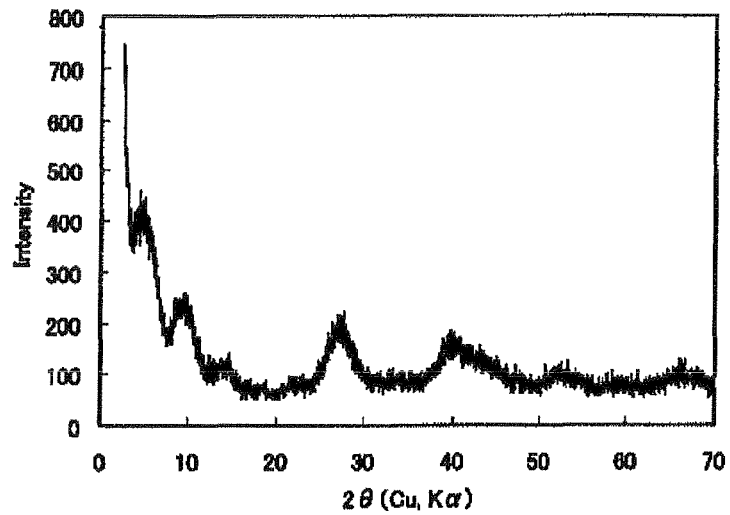

[Figure 4]
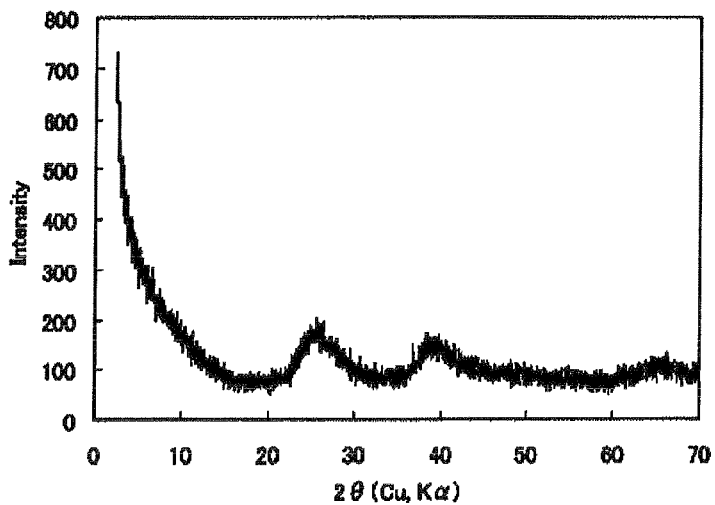
[Figure 5]
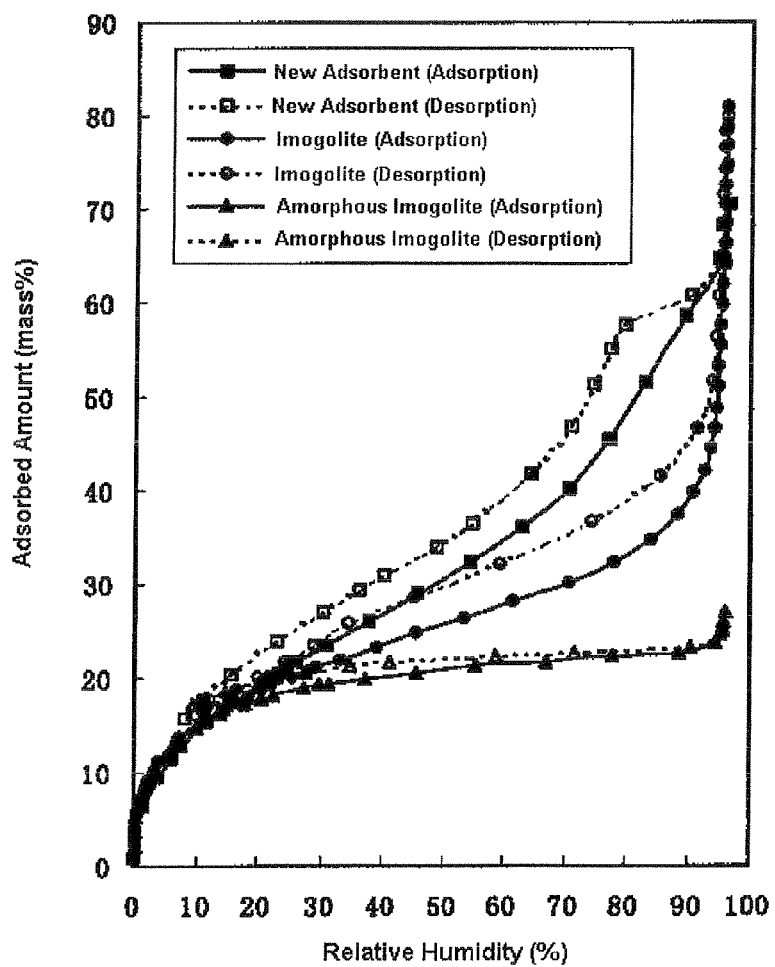

AMORPHOUS ALUMINUM SILICATE AND ADSORBENT EACH HAVING EXCELLENT MOISTURE ADSORPTION/DESORPTION CHARACTERISTICS IN MEDIUM-HUMIDITY RANGE

TECHNICAL FIELD

The present invention generally relates to a substance, in which its application as an innovative functional material is expected, that yields superior physicochemical characteristics such as high-specific surface area, high pore volume, ion exchange performance, and adsorption performance based on a microstructure resulting from a unique shape in the field of nanotechnology, in which its practical application is strongly expected, as the important fundamental technology that will support the next-generation industry, and in particular relates to an amorphous aluminum silicate and an adsorbent formed from such amorphous aluminum silicate having excellent moisture adsorption and desorption characteristics in a medium-humidity range.

BACKGROUND ART

A nano-sized tubular aluminum silicate is naturally produced as an imogolite, and an imogolite exists in soil, and is primarily produced in soil deriving from volcanic ash. Moreover, a natural imogolite, together with allophane as the related mineral, affects the transfer of nutrients and moisture in the soil and their supply to plants, and also affects the accumulation and residue of hazardous contaminated substances. The foregoing tubular aluminum silicate has, as its primary constituent elements, silicon (Si), aluminum (Al), oxygen (O) and hydrogen (H), and is a hydrated aluminum silicate assembled from numerous Si—O—Al bonds of a tubular shape having an outer diameter of 2.2 to 2.8 nm, an inner diameter of 0.5 to 1.2 nm, and a length of 10 nm to several μm, and is naturally a clay constituent distributed in the soil having as its base material ash fall ejecta such as volcanic ash and pumice.

A protoimogolite is a substance that is known to be a precursor of the imogolite, and possesses the property that derives from the imogolite structure. Consequently, an imogolite and a protoimogolite have roughly the same adsorption behavior at a relative humidity of 20% or less even regarding water vapor adsorption characteristics, and, although the protoimogolite does grow to a relatively long tube shape as with a crystalline imogolite, it is considered to possess the imogolite structure. Accordingly, a protoimogolite possesses a similar adsorbent property as with an imogolite in a low-humidity range.

The unique shape and physical properties of an imogolite as the nano-sized tubular aluminum silicate are considered to be industrially useful. In other words, since an imogolite is characterized in being able to adsorb various substances based on its unique microstructure, for instance, it has been conventionally said that an imogolite has application potency as a hazardous contaminant adsorbent, a deodorant, or a gas storage material of carbon dioxide, methane and the like. In addition, since an imogolite yields superior water vapor adsorption performance, its application as a heat pump heat exchange material, a dew condensation prevention agent, an autonomous humidity control material and the like is also expected.

In particular, since desiccant air conditioning aims to eliminate the moisture content in the air that is introduced from the outside air, it is required to efficiently eliminate the moisture content even from the high humidity air in the summer, and the adsorbent that is sought in the desiccant air conditioning is generally demanded of a high adsorption amount at a relative humidity of roughly 5% to 60%.

Under the foregoing circumstances, the mass synthesis at an industrially low cost is demanded without losing the foregoing characteristics of the tubular aluminum silicate. However, since a protoimogolite has a short tube length, it is unable to form fine pores of tubes as with an imogolite, and it can hardly adsorb water vapor in a medium-humidity range or a high-humidity range. Because of these factors, it is necessary to synthesize substances that can adsorb water vapor even in a medium-humidity range or a high-humidity range.

Moreover, even with an imogolite, since it has a relatively long tube length in which the aspect ratio is approximately 1000, the substance shows good performance in a low-humidity range and a high-humidity range at a relative humidity of 90% or higher, but has a drawback in that the adsorption amount is small in a medium-humidity range.

Conventionally, the development of adsorbents utilizing the unique fine a pore of an imogolite or an amorphous imogolite has been made (refer to Patent Documents 1 and 2). Nevertheless, with these conventional methods, it was not possible to achieve an adsorption amount of 30 wt % at a relative humidity of 60%.

[Patent Document 1] Japanese Patent Laid-Open Publication No. 2001-064010

[Patent Document 2] Japanese Patent Laid-Open Publication No. 2004-059330

DISCLOSURE OF THE INVENTION

The present invention was devised in view of the foregoing circumstances, and an object thereof is to provide a material having superior adsorption performance in a medium-humidity range by synthesizing an amorphous aluminum silicate formed from protoimogolite, and an adsorbent yielding such excellent adsorption characteristics, particularly for desiccant air conditioning.

In order to achieve the foregoing object, as a result of intense study, the present inventors discovered that the Si/Al ratio was low at 0.35 to 0.55 in the conventional synthesis of imogolite or amorphous imogolite. As a result of further intense study, the present inventors aimed to provide a substance that yields high adsorption performance in a medium-humidity range by mixing the starting solution upon raising the Si/Al ratio to be higher than the conventional Si/Al ratio, performing desalting treatment thereto and, during the subsequent heating process, bonding the periphery of the formed protoimogolite with excessive silicon, and thereby completed the present invention by succeeding in developing a synthesizing method of amorphous aluminum silicate formed from protoimogolite that yields excellent adsorption performance in a medium-humidity range.

Specifically, in order to achieve the foregoing object, the present invention provides:

(1) An amorphous aluminum silicate formed from protoimogolite having excellent moisture adsorption and desorption characteristics in a medium-humidity range;

(2) The amorphous aluminum silicate according to paragraph (1) above, wherein a mono-silicate aqueous solution and an aluminum solution are mixed so that the Si/Al ratio becomes 0.6 to 1, the mixed solution is once alkafied and thereafter neutralized by adding acid thereto, and subsequently subject to desalting treatment and heating treatment;

(3) An adsorbent formed from the amorphous aluminum silicate according to paragraph (1) or paragraph (2) above; and
(4) An adsorbent for desiccant air conditioning formed from the amorphous aluminum silicate according to paragraph (1) or paragraph (2) above.

Accordingly, the present invention is able to provide an amorphous aluminum silicate formed from protoimogolite having excellent adsorption behavior in a medium-humidity range, and an adsorbent for desiccant air conditioning utilizing the characteristics of such amorphous aluminum silicate formed from protoimogolite having excellent adsorption behavior in a medium-humidity range. The present invention additionally yields a special effect of being able to provide a hazardous contaminant adsorbent, a deodorant, and a gas storage material of carbon dioxide, methane and the like.

BRIEF DESCRIPTION OF THE DRAWINGS

FIG. 1 shows a powder X-ray diffraction diagram of Example 1;
FIG. 2 shows a $^{29}Si$ solid NMR spectrum of Example 1;
FIG. 3 shows a powder X-ray diffraction diagram of Comparative Example 1;
FIG. 4 shows a powder X-ray diffraction diagram of Comparative Example 2; and
FIG. 5 is a diagram showing the results of water vapor adsorption isotherm regarding Example 1 and Comparative Examples 1 and 2.

BEST MODE FOR CARRYING OUT THE INVENTION

The present invention is now explained in further detail.

The aluminum silicate containing protoimogolite according to the present invention has, as its primary constituent elements, silicon (Si), aluminum (Al), oxygen (O) and hydrogen (H), and is a hydrated aluminum silicate assembled from numerous Si—O—Al bonds. A protoimogolite refers to a precursor substance which becomes an imogolite by heating it at roughly 100° C., and is a substance that has a part of the structure of an imogolite.

The aluminum silicate formed from protoimogolite can be artificially obtained by mixing an inorganic silicon compound solution and an inorganic aluminum compound solution, subjecting silicon and aluminum to polymerization and subsequently to desalting treatment, and thereafter performing heating and aging thereto.

In the present invention, the aluminum silicate substance formed from protoimogolite must yield the performance of adsorbing water vapor of 30 wt % or higher at a relative humidity of 60%, and must be an aluminum silicate that is different from an imogolite or amorphous imogolite as the conventionally known tubular aluminum silicate.

In other words, as a result of intense study, the present inventors discovered that by mixing a starting solution upon raising the Si/Al ratio to be higher than the conventional Si/Al ratio during the synthesis of imogolite or protoimogolite, once alkafying the mixed solution to approximately pH10. and thereafter neutralizing it once again by adding acid thereto, and subsequently performing desalting treatment and heating treatment, it is possible to obtain an amorphous aluminum silicate capable of providing a substance having excellent moisture adsorption behavior in a medium-humidity range that could not be obtained conventionally.

In the present invention, for the preparation of the tubular aluminum silicate, an inorganic silicon compound or an inorganic aluminum compound is generally used as the raw material. The reagent to be used as the silicon source will suffice so as long as it is a mono-silicate, and specifically sodium orthosilicate, sodium metasilicate, amorphous colloidal silicon dioxide (Aerosil), etc.) and the like can be listed as preferable choices. In addition, the aluminum source to be bonded with the foregoing silicate molecules will suffice so as long as it is an aluminum ion, and specifically aluminum compounds such as aluminum chloride, aluminum nitrate and sodium aluminate can be listed as preferable choices. The foregoing silicon source and aluminum source are not limited to the foregoing compounds, and other sources that yield the same effects can also be used.

These raw materials are dissolved in an appropriate aqueous solution to prepare a solution of a prescribed concentration. In order to achieve excellent adsorption behavior at a relative humidity of 60%, it is necessary to perform the mixing so that the silicon/aluminum ratio becomes 0.6 to 1.0. The concentration of the silicon compound in the solution is 1 to 1000 mmol/L and the concentration of the aluminum compound solution is 1 to 1000 mmol/L, but preferably concentration of mixing 1 to 300 mmol/L of silicon compound solution and 1 to 300 mmol/L of aluminum compound solution is desirable. Based on the foregoing ratios and concentrations, the silicon compound solution is mixed with the aluminum compound solution, and, after forming the precursor, the coexisting ions in the solution are eliminated by way of centrifugal separation, filtration, membrane separation and the like. Subsequently, the collected precursor is dispersed in an acidulous to mildly alkaline aqueous solution and subject to heating and synthesizing, whereby the produced solid content is the amorphous aluminum silicate containing protoimogolite.

EXAMPLES

The present invention is now explained in detail based on the Examples and Comparative Examples. Nevertheless, the present invention is not limited by the following Examples in any way.

Example 1

The amount of 300 ml of a sodium orthosilicate aqueous solution diluted with purified water was prepared so that the Si concentration became 120 mmol/L. Aside from this, aluminum chloride was dissolved in purified water, and 300 ml of aqueous solution having an Al concentration of 150 mmol/L was prepared. Subsequently, the sodium orthosilicate aqueous solution was mixed with the aluminum chloride aqueous solution, and stirred with a magnetic stirrer. The silicon/aluminum ratio in this case was 0.8. Moreover, 35 ml of 1N sodium hydroxide aqueous solution was dripped into the mixed solution to obtain a pH of 10, and 7 ml of 1N hydrochloric acid was thereafter dripped therein to obtain a pH of 7.2.

A precursor was collected from the solution by way of centrifugal separation, and, after cleansing the precursor with purified water by performing centrifugal separation twice, it was dispersed in 2 L of purified water. After 3.2 ml of 1N hydrochloric acid was added to the 2 L precursor suspension to obtain a pH of 6.0, mixed for two hours at room temperature, thereafter transferred to a 2 L Teflon (registered trademark) airtight container, and heated in a constant temperature bath for two days at 100° C., an aqueous solution containing an amorphous aluminum silicate formed from protoimogolite was obtained. After cooling, the aqueous solution was dried at 60° C., and thereafter cleansed with a filter having a pore diameter of 0.2 µm.

The obtained product material was subject to X-ray diffraction and $^{29}$Si solid NMR measurement.

FIG. 1 shows the powder X-ray diffraction diagram of the obtained product material. As shown in FIG. 1, broad peaks can be seen in the vicinity of 2θ=27° and 40°, and significant peaks of an amorphous aluminum silicate were observed.

Consequently, it has been confirmed that the substance of Example 1 is an amorphous substance.

FIG. 2 shows the spectrum of the obtained product material based on the $^{29}$Si solid NMR measurement.

With the substance obtained in Example 1, since the peak was seen in the vicinity of −78 ppm, it has been confirmed that the product material has a $Q^3$3 Al structure, which is a characteristic structure to imogolite and protoimogolite.

Comparative Example 1

A tubular aluminum silicate (imogolite) was obtained as follows.

The amount of 200 ml of a sodium orthosilicate aqueous solution diluted with purified water was prepared so that the Si concentration became 60 mmol/L. Aside from this, aluminum chloride was dissolved in purified water, and 200 ml of aqueous solution having an Al concentration of 150 mmol/L was prepared. Subsequently, the sodium orthosilicate aqueous solution was mixed with the aluminum chloride aqueous solution, and stirred with a magnetic stirrer. The silicon/aluminum ratio in this case was 0.4. Moreover, 44.8 ml of 1N sodium hydroxide aqueous solution was dripped into the mixed solution to obtain a pH of 6. A precursor was collected from the solution by way of centrifugal separation, and, after cleansing the precursor with purified water by performing centrifugal separation twice, it was dispersed in 2 L of purified water. After 10 ml of 1N hydrochloric acid was added to the 2 L precursor suspension to obtain a pH of 4.2, mixed for one hour at room temperature, thereafter transferred to a 2 L Teflon (registered trademark) airtight container, and heated in a constant temperature bath for four days at 100° C., an aqueous solution containing imogolite was obtained. After cooling, the aqueous solution was dried at 60° C., and thereafter cleansed with a filter having a pore diameter of 0.2 μm.

The obtained product material was analyzed by way of X-ray diffraction.

FIG. 3 shows the powder X-ray diffraction diagram of the obtained product material. As evident from FIG. 3, the obtained product material showed a peak in the vicinity of 2θ=4, 9.5, 14, 27, 40° in the powder X-ray diffraction, and showed an X-ray diffraction pattern that is characteristic to a tubular aluminum silicate.

Comparative Example 2

An amorphous aluminum silicate (amorphous imogolite) was obtained as follows.

The amount of 200 ml of a sodium orthosilicate aqueous solution diluted with purified water was prepared so that the Si concentration became 60 mmol/L. Aside from this, aluminum chloride was dissolved in purified water, and 200 ml of aqueous solution having an Al concentration of 150 mmol/L was prepared. Subsequently, the sodium orthosilicate aqueous solution was mixed with the aluminum chloride aqueous solution, and stirred with a magnetic stirrer. The silicon/aluminum ratio in this case was 0.4. Moreover, 44.8 ml of 1N sodium hydroxide aqueous solution was dripped into the mixed solution to obtain a pH of 6. A precursor was collected from the solution by way of centrifugal separation, and, after cleansing the precursor with purified water by performing centrifugal separation twice, it was dispersed in 2 L of purified water. After 20 ml of 1N hydrochloric acid was added to the 2 L precursor suspension to obtain a pH of 3.7, mixed for one hour at room temperature, thereafter transferred to a 2 L Teflon (registered trademark) airtight container, and heated in a constant temperature bath for two days at 100° C., an aqueous solution containing amorphous imogolite was obtained. After cooling, the aqueous solution was dried at 60° C., and thereafter cleansed with a filter having a pore diameter of 0.2 μm.

The obtained product material was analyzed by way of X-ray diffraction.

FIG. 4 shows the powder X-ray diffraction diagram of the obtained product material. As evident from FIG. 4, the obtained aluminum silicate showed an X-ray diffraction pattern showing that it is amorphous without a specific peak.

(Water Vapor Adsorption Evaluation)

The amorphous aluminum silicate formed from protoimogolite obtained in Example 1, the imogolite obtained in Comparative Example 1, and the amorphous imogolite obtained in Comparative Example 2 were subject to water vapor adsorption evaluation from the water vapor adsorption isotherm measured with Belsorp 18 manufactured by Bell Japan, Inc. The results are shown in FIG. 5.

As shown in FIG. 5, the water vapor adsorption isotherm up to a relative humidity of 20% showed roughly the same adsorption behavior in all of the cases, and adsorption arising from the imogolite structure can be observed. However, the adsorption behavior between the relative humidity of 30% to 80% was considerably different. While the amorphous aluminum silicate formed from protoimogolite according to the present invention showed an absorbed amount of approximately 35 wt % at a relative humidity of 60%, the imogolite showed an absorbed amount of approximately 27 wt % at a relative humidity of 60%, and the amorphous imogolite showed an absorbed amount of approximately 21 wt % at a relative humidity of 60%, and both cases fell below 30 wt %.

As a result of the Example, it has been shown that the amorphous aluminum silicate formed from protoimogolite has an adsorbed amount of 30 wt % or higher at a relative humidity of 60%.

INDUSTRIAL APPLICABILITY

The present invention provides an amorphous aluminum silicate formed from protoimogolite that yields high adsorption performance in a medium-humidity range, and is useful as an autonomous humidity control regulator or a desiccant air conditioning desiccant, a hazardous contaminant adsorbent, a deodorant, and a gas storage material of carbon dioxide, methane and the like. Moreover, the present invention additionally enables the mass synthesis of the amorphous substance having the foregoing characteristics at low cost and with ease.

The invention claimed is:

1. An amorphous aluminum silicate formed from protoimogolite and having excellent moisture adsorption and desorption characteristics in a medium-humidity range
    wherein said excellent moisture adsorption and desorption characteristics in a medium humidity range includes adsorbing water vapor of 30wt % or higher at a relative humidity of 60%.

2. The amorphous aluminum silicate according to claim 1, wherein a mono-silicate aqueous solution and an aluminum solution are mixed so that the Si/Al ratio becomes 0.6 to 1, the mixed solution is once alkafied and thereafter neutralized by adding acid thereto, and subsequently subject to desalting treatment and heating treatment.

3. An adsorbent for desiccant air conditioning formed from the amorphous aluminum silicate according to claim 1 or claim 2.

4. An adsorbent comprising an amorphous aluminum silicate substance formed from protoimogolite and having a moisture adsorption characteristic of adsorbing water vapor of 30wt % or higher at a relative humidity of 60%.

5. An adsorbent according to claim 4, wherein said amorphous aluminum silicate substance contains protoimogolite.

6. An adsorbent according to claim 4, wherein said amorphous aluminum silicate substance formed from protoimogolite is artificially obtained by mixing a mono-silicate aqueous solution and an aluminum solution to form a mixed solution such that the Si/Al ratio is 0.6 to 1, the mixed solution is once alkafied and thereafter neutralized by adding acid thereto, and subsequently subject to desalting treatment and heating treatment.

7. An adsorbent according to claim 4, wherein said protoimogolite from which said amorphous aluminum silicate is formed is a precursor substance of imogolite and becomes imogolite when heated at 100° C.

8. An adsorbent according to claim 4, wherein said amorphous aluminum silicate substance has a $Q^3 3Al$ structure.

* * * * *